(12) United States Patent
Okuyama et al.

(10) Patent No.: US 10,836,094 B2
(45) Date of Patent: Nov. 17, 2020

(54) LIQUID BLOW MOLDING METHOD

(71) Applicants: Yuichi Okuyama, Tokyo (JP); Mitsuru Shiokawa, Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 279 days.

(21) Appl. No.: 15/775,796

(22) PCT Filed: Oct. 17, 2016

(86) PCT No.: PCT/JP2016/080736
§ 371 (c)(1),
(2) Date: May 11, 2018

(87) PCT Pub. No.: WO2017/090340
PCT Pub. Date: Jun. 1, 2017

(65) Prior Publication Data
US 2018/0326648 A1 Nov. 15, 2018

(30) Foreign Application Priority Data
Nov. 27, 2015 (JP) .................. 2015-232351

(51) Int. Cl.
*B29C 49/46* (2006.01)
*B29C 49/18* (2006.01)
*B65D 1/00* (2006.01)
*B65D 1/02* (2006.01)
*B29C 49/42* (2006.01)
*B29C 49/58* (2006.01)
*B29C 49/28* (2006.01)
(Continued)

(52) U.S. Cl.
CPC ............. *B29C 49/46* (2013.01); *B29C 49/18* (2013.01); *B65D 1/00* (2013.01); *B65D 1/0261* (2013.01);
(Continued)

(58) Field of Classification Search
CPC ......... B29C 49/46; B29C 49/18; B29C 49/28; B29C 2049/4658; B29C 2049/4655;
(Continued)

(56) References Cited

U.S. PATENT DOCUMENTS 6,514,451 B1    2/2003  Boyd et al.
2012/0315348 A1* 12/2012 Wilson .................... B29C 49/56
                                                          425/149
(Continued)

FOREIGN PATENT DOCUMENTS

EP    2 860 015 A1    4/2015
JP    S53-132064 A    11/1978
(Continued)

OTHER PUBLICATIONS

May 9, 2019 Extended Search Report issued in European Patent Application No. 16868289.6.

(Continued)

*Primary Examiner* — Leith S Shafi
*Assistant Examiner* — Inja Song
(74) *Attorney, Agent, or Firm* — Oliff PLC (57) ABSTRACT

A liquid blow molding method molds a bottomed tubular-shaped preform into a liquid-containing container in which a content liquid is held. The liquid blow molding method includes: a filling step of filling a first liquid in a first pressurizing source and filling a second liquid in a second pressurizing source; and a molding step of liquid blow molding the preform by simultaneously supplying, to the preform, the first liquid pressurized to a predetermined pressure by the first pressurizing source and the second liquid pressurized to a predetermined pressure by the second pressurizing source by simultaneously operating the first pressurizing source and the second pressurizing source.

3 Claims, 7 Drawing Sheets

(51) Int. Cl.
  *B29C 49/66* (2006.01)
  *B29C 49/12* (2006.01)
  *B29K 67/00* (2006.01)
  *B29L 31/00* (2006.01)
  *B29K 23/00* (2006.01)

(52) U.S. Cl.
  CPC .............. *B29C 49/12* (2013.01); *B29C 49/28* (2013.01); *B29C 49/4289* (2013.01); *B29C 49/66* (2013.01); *B29C 2049/4655* (2013.01); *B29C 2049/4658* (2013.01); *B29C 2049/4664* (2013.01); *B29C 2049/5841* (2013.01); *B29K 2023/12* (2013.01); *B29K 2067/003* (2013.01); *B29L 2031/7158* (2013.01)

(58) Field of Classification Search
  CPC .... B29C 2049/5841; B29C 2049/4664; B29C 49/4289; B29C 49/66; B29C 49/12; B65D 1/00; B65D 1/0261; B29K 2023/12; B29K 2067/003; B29L 2031/7158
  See application file for complete search history.

(56) References Cited

U.S. PATENT DOCUMENTS

| | | | |
|---|---|---|---|
| 2014/0367895 A1* | 12/2014 | Sato | B29C 49/12 264/532 |
| 2015/0101707 A1* | 4/2015 | Ranalletta | B65B 3/003 141/27 |
| 2015/0231812 A1* | 8/2015 | Klatt | B29C 49/12 264/532 |
| 2018/0126625 A1* | 5/2018 | Morikami | B29C 49/60 |
| 2018/0133949 A1* | 5/2018 | Gillet | B29C 49/76 |

FOREIGN PATENT DOCUMENTS

| | | |
|---|---|---|
| JP | 2013-132861 A | 7/2013 |
| JP | 2013-208834 A | 10/2013 |
| JP | 2014-069441 A | 4/2014 |
| JP | 2014-519429 A | 8/2014 |
| WO | WO 2013099108 A1 * | 7/2013 |
| WO | 2014/095384 A1 | 6/2014 |
| WO | 2014/127903 A1 | 8/2014 |
| WO | 2014/206978 A1 | 12/2014 |

OTHER PUBLICATIONS

May 29, 2018 International Preliminary Report on Patentability issued in International Patent Application No. PCT/JP2016/080736.

Dec. 27, 2016 International Search Report issued in International Patent Application No. PCT/JP2016/080736.

Jul. 23, 2019 Office Action issued in Japanese Patent Application No. 2015-232351.

Jul. 18, 2019 Office Action issued in Chinese Patent Application No. 201680069307.4.

* cited by examiner

LIQUID BLOW MOLDING METHOD

TECHNICAL FIELD

The present disclosure relates to a liquid blow molding method for molding a bottomed tubular-shaped preform into a liquid-containing container in which a content liquid is held. The present disclosure especially relates to a liquid blow molding method for molding a liquid-containing container in which a mixed liquid of a first liquid and a second liquid is held as the content liquid.

BACKGROUND

Resin-made containers, typical examples of which are polypropylene (PP) bottles and polyethylene terephthalate (PET) bottles, are used to hold a variety of liquids, such as a beverage, a cosmetic product, a pharmaceutical product, a detergent, and a toiletry including shampoo, as the content liquids. Such a container is generally produced by blow molding a preform that has been formed by a thermoplastic resin material as mentioned above in a bottomed tubular shape.

As an example of blow molding used to mold a preform into a container, liquid blow molding is known. In liquid blow molding, a pressurized liquid is used as a pressurizing medium supplied into the preform.

Patent Literature 1, for example, describes a liquid blow molding method for molding a preform into a container having a predetermined shape conforming to a cavity of a mold used for blow molding by placing, in the mold, the preform heated in advance to a temperature at which stretchability is achieved and by supplying, into the preform, a liquid pressurized to a predetermined pressure through a nozzle. According to the liquid blow molding method, since the content liquid, such as a beverage, to be held in the container as a final product may be used as the liquid supplied into the preform, the liquid-containing container in which the content liquid is held is molded easily by molding the container simultaneously with filling the content liquid into the container, and the process of filling the content liquid to the container after molding may be omitted. Accordingly, the production process and the configuration of production line (apparatus) may be simplified.

CITATION LIST

Patent Literature

PTL1: JP2013208834A

SUMMARY

Technical Problem

However, regarding, for example, a container configured to hold a liquid, such as a seasoning dressing in which one liquid mainly composed of oil and another liquid mainly composed of water are mixed, that is difficult to be maintained in a uniform mixed state, there is a problem that the aforementioned conventional liquid blow molding method is difficult to adopt. The reason is that it is difficult for the aforementioned conventional liquid blow molding method to supply the liquid into the preform through the nozzle while maintaining the liquid in the uniform mixed state.

The present disclosure has been conceived in view of the above problem, and the present disclosure is to provide a liquid blow molding method that may be adopted to mold a liquid-containing container holding a content liquid including two types of liquids that is difficult to be maintained in the uniform mixed state.

Solution to Problem

One of aspects of the present disclosure resides in a liquid blow molding method for molding a bottomed tubular-shaped preform into a liquid-containing container in which a content liquid is held. The liquid blow molding method includes: a filling step of filling a first liquid in a first pressurizing source and filling a second liquid in a second pressurizing source; and a molding step of liquid blow molding the preform by simultaneously supplying, to the preform, the first liquid pressurized to a predetermined pressure by the first pressurizing source and the second liquid pressurized to a predetermined pressure by the second pressurizing source by simultaneously operating the first pressurizing source and the second pressurizing source.

In a preferred embodiment of the presently disclosed liquid blow molding method configured as above, the liquid blow molding method further includes a suck-back step, performed after the molding step, of sucking a predetermined amount of the liquid out of the container after molding.

In another preferred embodiment of the presently disclosed liquid blow molding method configured as above, the liquid blow molding method further includes a pre-supply step, performed before the molding step of a preform to be molded next, of supplying, into the next preform at a predetermined pressure, the liquid that has been sucked out of the container in the suck-back step.

In yet another preferred embodiment of the presently disclosed liquid blow molding method configured as above, wherein, in the molding step, the first pressurizing source and the second pressurizing source are driven by a same driving source to operate simultaneously.

Advantageous Effect

The present disclosure provides a liquid blow molding method that may be adopted to mold a liquid-containing container holding a content liquid including two types of liquids that is difficult to be maintained in the uniform mixed state.

DETAILED DESCRIPTION

The present disclosure will be described in more detail below by illustration with reference to the drawings.

A liquid blow molding method according to the present disclosure for molding a bottomed tubular-shaped preform into a liquid-containing container in which a content liquid is held includes: a filling step of filling a first liquid in a first pressurizing source and filling a second liquid in a second pressurizing source; and a molding step of liquid blow molding the preform by simultaneously supplying, to the preform, the first liquid pressurized to a predetermined pressure by the first pressurizing source and the second liquid pressurized to a predetermined pressure by the second pressurizing source by simultaneously operating the first pressurizing source and the second pressurizing source. That is to say, the presently disclosed liquid blow molding method is configured, in a case where the content liquid to be held in the liquid-containing container after molding is a mixed liquid of the first liquid and the second liquid, to simultaneously supply the first and second liquids to the preform from the separate pressurizing sources for liquid blow molding. The presently disclosed liquid blow molding method may be called a production method of the liquid-containing container holding the content liquid in which the first liquid and the second liquid are mixed. The presently disclosed liquid blow molding method may be implemented with use of a liquid blow molding apparatus 1 with a configuration for example of FIG. 1.

Figure 1:
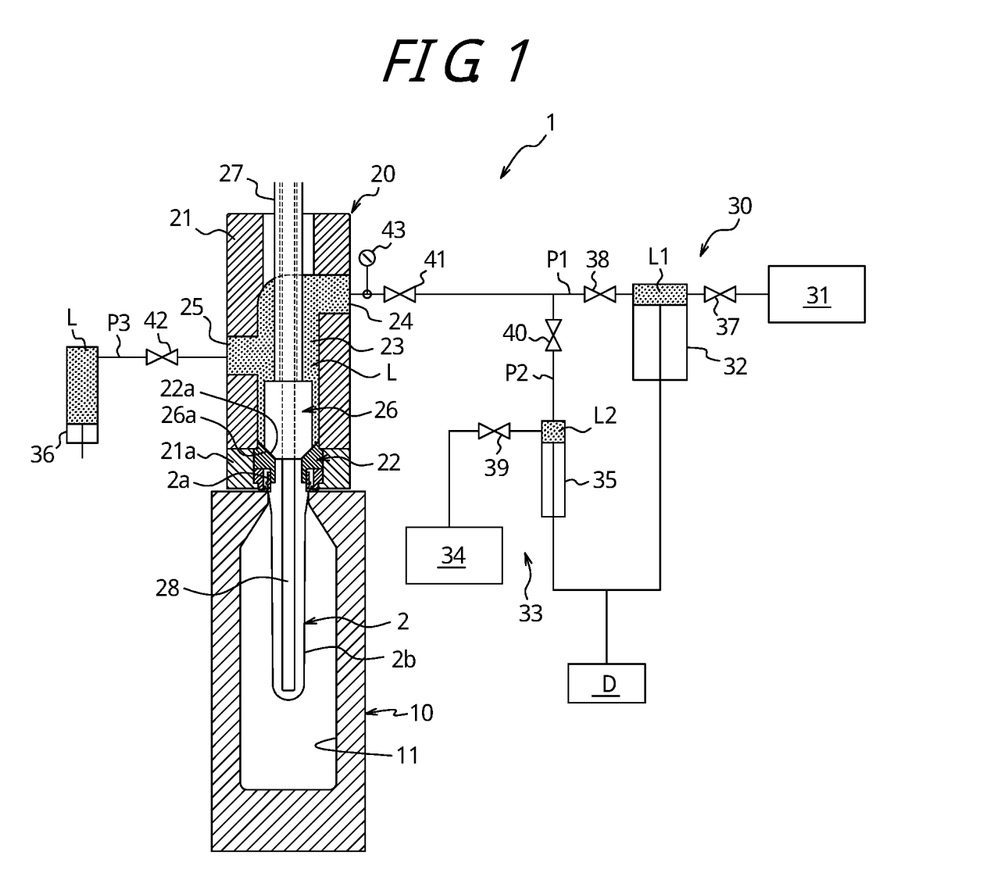
FIG. 1 illustrates an example of a liquid blow molding apparatus that is used to implement a liquid blow molding method according to one of embodiments of the present disclosure.

The liquid blow molding apparatus 1 illustrated in FIG. 1 is configured to liquid blow mold a preform 2 into the liquid-containing container holding therein the content liquid. Liquid blow molding refers to blow molding using a pressurized liquid, instead of pressurized air that is used in air blow molding, as a pressurizing medium (pressurizing fluid) supplied to the preform 2.

A mixed liquid of the first liquid L1 and the second liquid L2 may be used as the liquid L supplied to the preform 2, namely, the content liquid L to be held in the liquid-containing container after molding. Examples of the mixed liquid may include a seasoning dressing in which the first liquid L1 mainly composed of oil and the second liquid L2 mainly composed of water and having properties to be easily separated from the first liquid L1 are mixed. Although such a liquid L is difficult to be maintained in a uniform mixed state, the liquid L may be used to mold the preform 2 into the liquid-containing container according to the presently disclosed liquid blow molding method.

Additionally, the liquid (content liquid) L is not limited to the seasoning dressing, and any of a variety of liquids, such as a cosmetic product and a beverage, that is difficult to be maintained in the uniform mixed states may be used as the liquid L.

As the preform 2, a preform may be used that has been formed by a thermoplastic resin material, such as polypropylene (PP) and polyethylene terephthalate (PET), in a bottomed tubular shape having a cylindrical-shaped mouth 2a as an opening end and a cylindrical-shaped trunk 2b, which is connected to the mouth 2a and which has a lower end that is closed. Note that in the drawings the trunk 2b is depicted with the thickness being omitted for convenience.

The preform 2 does not necessarily have the aforementioned shape and may have a variety of bottomed tubular shapes depending on the shape of the container after molding.

Although not illustrated in detail, the mouth 2a is provided, on an outer wall surface thereof, with an engagement projection to attach a closing cap (which is not illustrated) to the mouth 2a of the liquid-containing container after molding by plugging (undercut engagement). Additionally, a male screw, instead of the engagement projection, may also be provided on the outer wall surface of the mouth 2a, and the closing cap may be attached to the mouth 2a by screw connection.

The liquid blow molding apparatus 1 includes a mold 10 used for blow molding. The mold 10 has a cavity 11, which has a shape corresponding to the final shape, such as a bottle shape, of the container. The cavity 11 is open upward on an upper surface of the mold 10. The preform 2 is fitted in the mold 10, with the trunk 2b being arranged within the cavity 11 of the mold 10 and with the mouth 2a protruding upward from the mold 10.

Although not illustrated in detail, the mold 10 may be opened into left and right mold halves, and the liquid-containing container may be removed from the mold 10 by opening the mold 10 into the left and right halves after the preform 2 is molded into the liquid-containing container.

Above the mold 10, there is disposed a nozzle unit 20, which is configured to supply the liquid L into the preform 2. The nozzle unit 20 includes a main body block 21, which is displaceable in upward and downward directions relative to the mold 10. The main body block 21 is provided, in a lower end thereof, with a support block 21a, and a blow nozzle 22 is supported by the support block 21a to be attached to the lower end of the main body block 21. The blow nozzle 22 is formed in a substantially cylindrical shape and configured to engage, from above, with the mouth 2a of the preform 2 fitted in the mold 10 when the main body block 21 is displaced downward to the lowermost stroke end. The blow nozzle 22 is provided, on an upper surface thereof, with a sealing surface 22a, which has a conical surface shape tapered with a diameter decreasing downward.

The main body block 21 is provided, inside thereof, with a supply path 23, which extends vertically. The supply path 23 is a flow path used to supply the first liquid L1 and the second liquid L2 to the blow nozzle 22, and the supply path 23 in a lower end thereof communicates with the blow nozzle 22. The main body block 21 is also provided with a supply port 24, which communicates with an upper end of the supply path 23, and a suck-back port 25, which communicates with a middle portion of the supply path 23.

In the supply path 23, a sealing body 26, which is configured to open and close the blow nozzle 22, is disposed. The sealing body 26 is fixed to a lower end of a shaft body 27, which is disposed in the nozzle unit 20 in a manner such that the shaft body 27 is displaceable in the upward and downward directions. Thus, the sealing body 26 is displaceable in the upward and downward directions inside the supply path 23. The sealing body 26 is formed in a cylindrical shape and provided, in an outer peripheral portion of a lower end surface thereof, with a tapered abutment surface 26a. The abutment surface 26a has the same inclination angle as that of the sealing surface 22a of the blow nozzle 22, so that the abutment surface 26a may closely contact the sealing surface 22a when the sealing body 26 is displaced to a closed position, that is, a lowermost stroke end position. Accordingly, when the sealing body 26 reaches the closed position, the blow nozzle 22 is closed by the sealing body 26, and the communication between the blow nozzle 22 and the supply path 23 is blocked. On the other hand, when the sealing body 26 is displaced upward from the closed position, the blow nozzle 22 is opened to communicate with the supply path 23.

As illustrated, the liquid blow molding apparatus 1 may include a stretching rod 28. In this case, biaxial stretch blow molding may be performed. In biaxial stretch blow molding, the preform 2 is stretched in the axis direction by the stretching rod 28 while being stretched in the radial direction by the pressurized liquid L supplied through the mouth 2a. Additionally, the liquid blow molding apparatus 1 does not necessarily need to include the stretching rod 28.

A first liquid supply unit 30 is connected to the supply port 24 through a first pipe P1. The first liquid supply unit 30 includes a first tank 31 and a first pressurizing source 32, which is connected to the downstream side of the first tank 31. The first tank 31 may be configured to hold the first liquid L1 and to heat the first liquid L1 to a predetermined temperature and keep the first liquid L1 at the predetermined temperature. The first pressurizing source 32 is configured to draw the first liquid L1 held in the first tank 31 and to pressurize the drawn first liquid L1 to a predetermined pressure and supply the pressurized first liquid L1 to the supply path 23 through the supply port 24.

A second pipe P2 is connected in the form of a branch to a divergence point of the first pipe P1 that is located between the first liquid supply unit 30 and the supply port 24, and a second liquid supply unit 33 is connected to the second pipe P2. The second liquid supply unit 33 includes a second tank 34 and a second pressurizing source 35, which is connected to the downstream side of the second tank 34. The second tank 34 holds the second liquid L2. The second pressurizing source 35 is configured to draw the second liquid L2 held in the second tank 34 and to pressurize the drawn second liquid L2 to a predetermined pressure and supply the pressurized second liquid L2 to the supply path 23 through the second pipe P2, the first pipe P1, and the supply port 24.

In the illustrated example, the first pressurizing source 32 and the second pressurizing source 35 are configured by plunger pumps and configured to be driven by the same driving source D to operate simultaneously.

Additionally, the first pressurizing source 32 and the second pressurizing source 35 are not limited to the plunger pumps and may be configured by differently configured pressurizing sources that are capable of pressurizing the first liquid L1 held in the first tank 31 to the predetermined pressure and pressurizing the second liquid L2 held in the second tank 34 to the predetermined pressure and supplying the pressurized first liquid L1 and second liquid L2 to the supply path 23. Furthermore, depending on a ratio of the first liquid L1 to the second liquid L2 in the content liquid L, different sizes of pressurizing sources that are suitable for the ratio are used as the first pressurizing source 32 and the second pressurizing source 35. For example, in the illustrated example, a plunger of a larger size is used as the first pressurizing source 32 compared with the second pressurizing source 35.

A suck-back plunger 36 is connected to the suck-back port 25 through a suck-back pipe P3. The suck-back plunger 36 is configured to suck a predetermined amount of the liquid L out of the container after molding via the supply path 23, the suck-back port 25, and the suck-back pipe P3 and also configured to supply the sucked-out liquid L toward the preform 2 through an operation and a route opposite to the above.

A first opening-closing valve 37 is disposed between the first tank 31 and the first pressurizing source 32, and a second opening-closing valve 38 is disposed between the first pressurizing source 32 and the divergence point. Furthermore, a third opening-closing valve 39 is disposed between the second tank 34 and the second pressurizing source 35, and a fourth opening-closing valve 40 is disposed between the second pressurizing source 35 and the divergence point. Moreover, a joining opening-closing valve 41 is disposed at a position in the first pipe P1 that is near the supply port 24, and a suck-back opening-closing valve 42 is disposed between the suck-back port 25 and the suck-back plunger 36. Each of these opening-closing valves 37 to 42 is configured by an electromagnetic valve and operates to open and close to switch the corresponding pipe P1, P2, or P3 between a closed state and an opened state. Furthermore, the opening-closing valves 37 to 42 are controlled to open and close at predetermined timings by a control unit or the like which is not illustrated.

A pressure gauge 43 is further disposed in the first pipe P1, and data measured by the pressure gauge 43 is inputted to the control unit which is not illustrated.

The control unit which is not illustrated is also connected, for example, to the first liquid supply unit 30, the second liquid supply unit 33, and the suck-back plunger 36, and the operation of the liquid blow molding apparatus 1 is integratedly controlled by the control unit.

Next, a description is given of a method (i.e., liquid blow molding method according to the present disclosure) for molding the preform 2 into the liquid-containing container in which the content liquid is held inside the container having a predetermined shape by using the liquid blow molding apparatus 1 with the above configuration.

Firstly, the preform 2 that has been heated in advance to the predetermined temperature (e.g., from 80° C. to 150° C.) around which stretchability is achieved by using a heating unit (which is not illustrated) such as a heater is fitted in the mold 10 used for blow molding, and the mold 10 is closed. Then, the nozzle unit 20 is displaced downward to engage the blow nozzle 22 to the mouth 2a of the preform 2.

Figure 2:
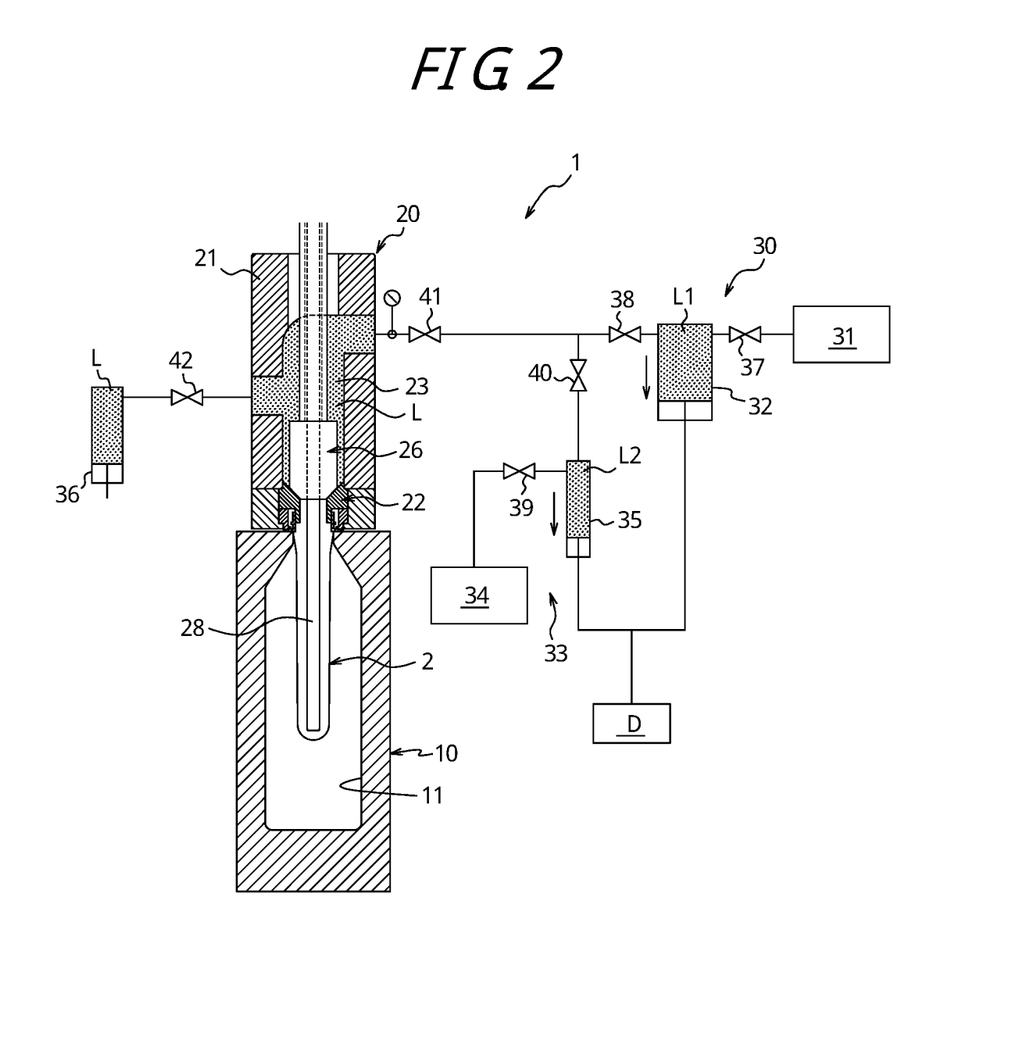
FIG. 2 illustrates the liquid blow molding apparatus in a state where a filling step is performed.

Next, the filling step is performed. In the filling step, as illustrated in FIG. 2, the first pressurizing source 32 is subject to pull operation in a state where the sealing body 26 remains closed, where the first opening-closing valve 37 is opened, and where the second opening-closing valve 38 is closed, thereby drawing the first liquid L1 held in the first tank 31 by the first pressurizing source 32 to be filled in the first pressurizing source 32. Furthermore, the second pressurizing source 35 is subject to pull operation in a state where the third opening-closing valve 39 is opened and where the fourth opening-closing valve 40 is closed, thereby drawing the second liquid L2 held in the second tank 34 by the second pressurizing source 35 to be filled in the second pressurizing source 35. At this time, the joining opening-closing valve 41, the suck-back opening-closing valve 42, and the sealing body 26 are closed. In this state, the liquid blow molding apparatus 1 is kept in a standby state until liquid blow molding is performed.

Figure 3:
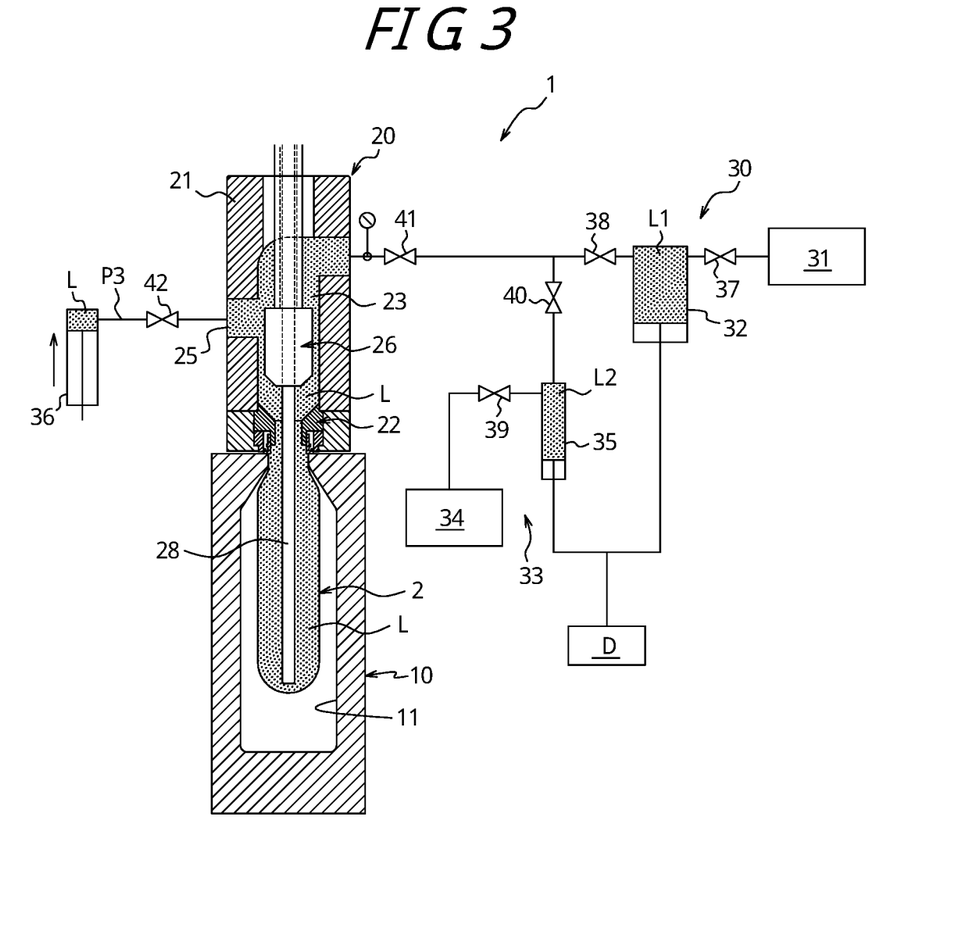
FIG. 3 illustrates the liquid blow molding apparatus in a state where a pre-supply step is performed.

The presently disclosed liquid blow molding method may include a pre-supply step performed after the standby state and before the molding step which is described later. In the pre-supply step, as illustrated in FIG. 3, the suck-back plunger 36 is operated in a state where the first opening-closing valve 37, the second opening-closing valve 38, the third opening-closing valve 39, the fourth opening-closing valve 40, and the joining opening-closing valve 41 are closed and where the sealing body 26 and the suck-back opening-closing valve 42 are opened, thereby supplying the liquid L filled in the suck-back plunger 36 to the preform 2 at a predetermined pressure via the suck-back pipe P3, the suck-back port 25, the supply path 23, and the blow nozzle 22. With the liquid L supplied from the suck-back plunger 36 to the preform 2 at the predetermined pressure, the preform 2 is liquid blow molded into a half-way shape by the liquid L. Additionally, although in the present embodiment the first opening-closing valve 37, the second opening-closing valve 38, the third opening-closing valve 39, the fourth opening-closing valve 40, and the joining opening-closing valve 41 are closed in the pre-supply step, closing at least the joining opening-closing valve 41 suffices.

The liquid L filled in the suck-back plunger 36, that is, the liquid L supplied from the suck-back plunger 36 to the preform 2 in the pre-supply step, is the liquid L that has been sucked out of the container after molding in a suck-back step which is described later. By thus using the suck-back plunger 36, which is a system different from the first pressurizing source 32 and the second pressurizing source 35, in the pre-supply step to supply the liquid L that has been sucked out of the container after molding into the preform 2, the following advantage is provided. That is to say, in a case where the suck-back step is performed after the molding step, the liquid L in which the first liquid L1 and the second liquid L2 are mixed is prevented from entering the first pressurizing source 32 and the second pressurizing source 35 by the suck-back step, and a mixture ratio of the first liquid to the second liquid in the content liquid L to be held in the container after molding is accurately regulated to a predetermined ratio.

In the pre-supply step, all the liquid L filled inside the suck-back plunger 36 is pushed out toward the preform 2. Consequently, even when the liquid L filled inside the suck-back plunger 36 separates into the first liquid L1 and the second liquid L2 during the standby state before the pre-supply step in which the liquid L is supplied to the preform 2, the first liquid L1 and the second liquid L2 are supplied to the preform 2 at the predetermined ratio by pushing out all the liquid L filled inside the suck-back plunger 36 toward the preform 2.

Figure 4:
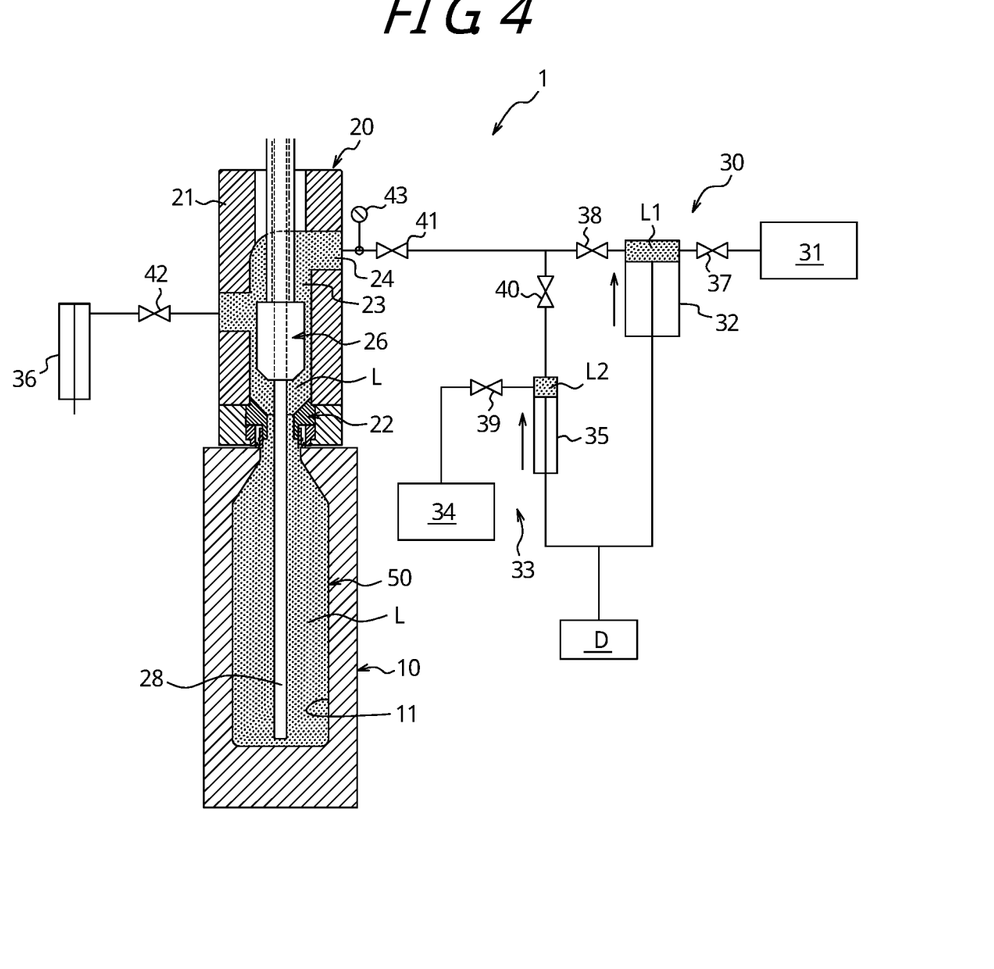
FIG. 4 illustrates the liquid blow molding apparatus in a state where a molding step is performed.

After the pre-supply step is completed, the pre-supply step is followed by the molding step. In the molding step, as illustrated in FIG. 4, the first pressurizing source 32 and the second pressurizing source 35 are simultaneously operated by the driving source D in a state where the sealing body 26 remains opened, where the first opening-closing valve 37, the third opening-closing valve 39, and the suck-back opening-closing valve 42 are closed, and where the second opening-closing valve 38, the fourth opening-closing valve 40, and the joining opening-closing valve 41 are opened. Consequently, the liquid L in which the first liquid L1 pressurized to the predetermined pressure by the first pressurizing source 32 and the second liquid L2 pressurized to the predetermined pressure by the second pressurizing source 35 are joined and mixed at the predetermined ratio is supplied into the preform 2 through the supply port 24, the supply path 23, and the blow nozzle 22 to liquid blow mold the preform 2 by the liquid L. In the molding step, the preform 2 is liquid blow molded into a container 50 having the predetermined shape conforming to the cavity 11. Note that a pressure of the liquid L measured by the pressure gauge 43 is higher than a pressure inside the preform 2 that is being liquid blow molded.

Additionally, in a case where the stretching rod 28 is disposed, the preform 2 is stretched in the longitudinal direction by the stretching rod 28 by displacing the stretching rod 28 downward in the pre-supply step and the molding step.

Figure 5:
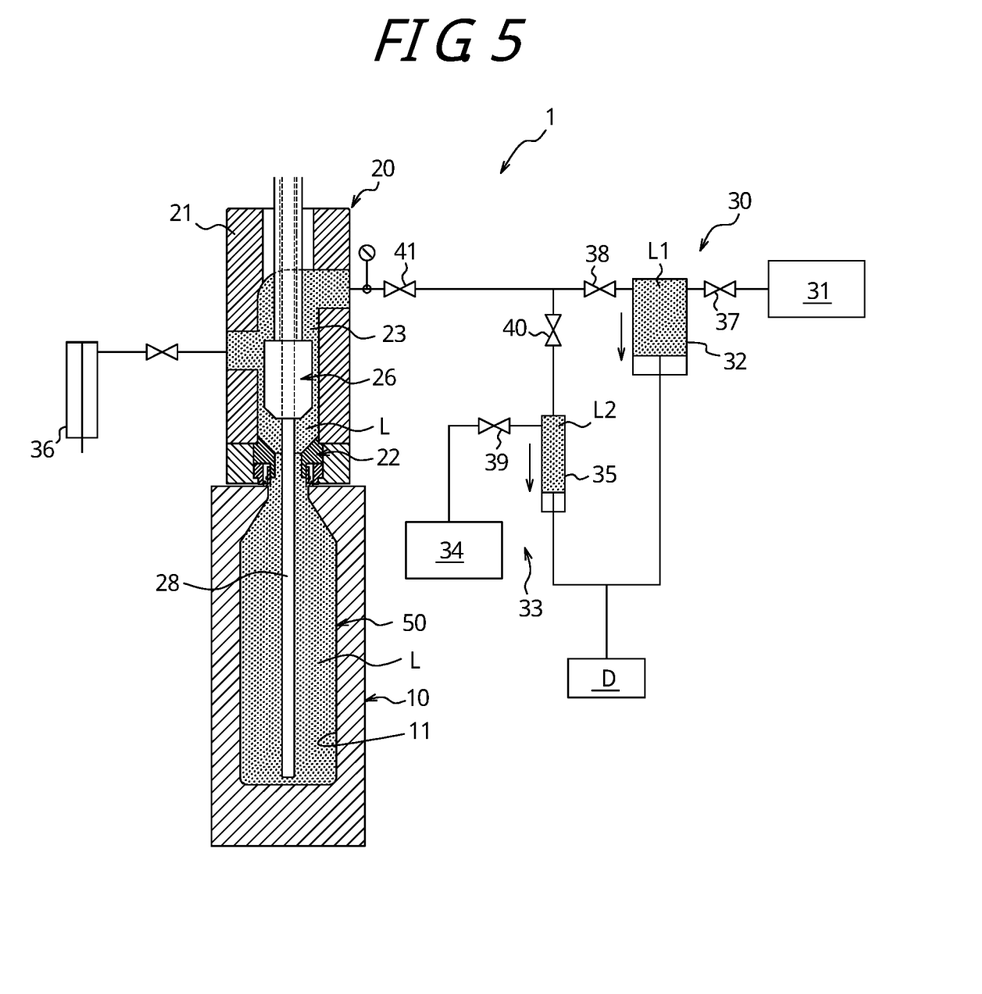
FIG. 5 illustrates the liquid blow molding apparatus in a state where the molding step is completed.

After the preform 2 is liquid blow molded into the container 50, as illustrated in FIG. 5, the first pressurizing source 32 and the second pressurizing source 35 are subject to pull operation in a state where the sealing body 26, the first opening-closing valve 37, and the third opening-closing valve 39 remain opened and where the second opening-closing valve 38, the fourth opening-closing valve 40, and the joining opening-closing valve 41 are closed. Consequently, the filling step to prepare for the molding step of the next preform 2 is performed, and the first liquid L1 is filled in the first pressurizing source 32, and the second liquid L2 is filled in the second pressurizing source 35. Note that the filling step may be performed at various timings prior to the molding step, such as after the placement of the new preform 2 and before the pre-supply step as illustrated in FIG. 2.

Figure 6:
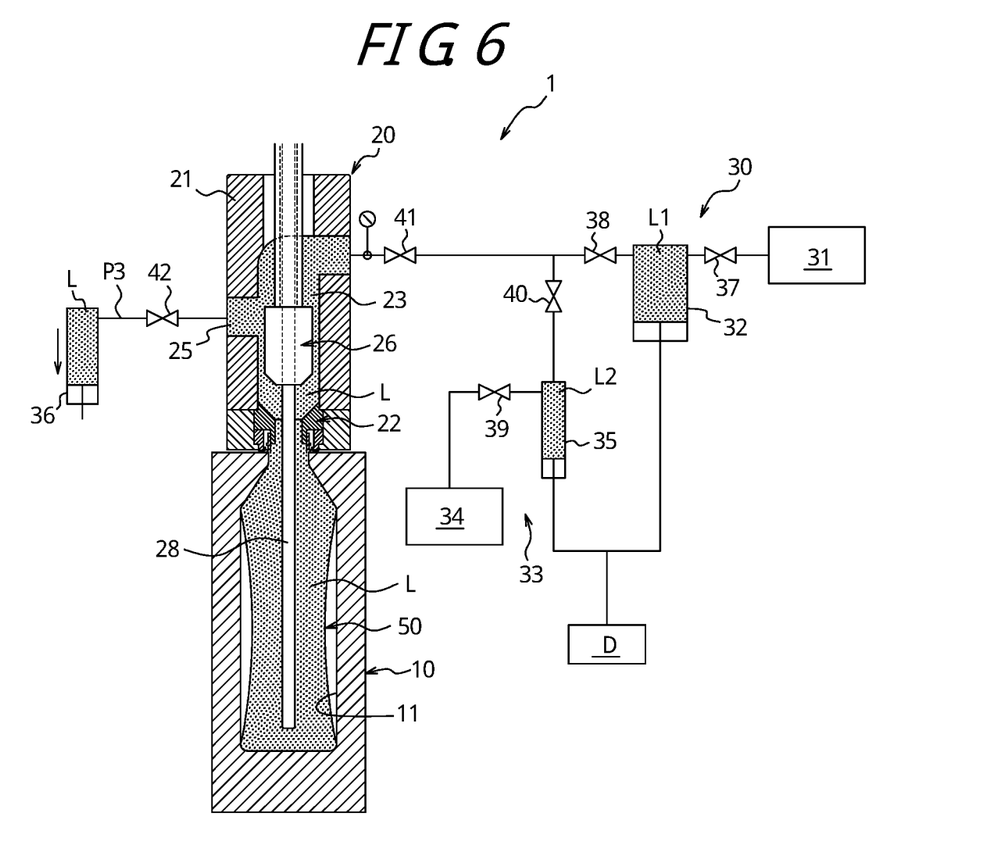
FIG. 6 illustrates the liquid blow molding apparatus in a state where a suck-back step is performed.

The presently disclosed liquid blow molding method may include the suck-back step performed after the molding step is completed. As illustrated in FIG. 6, in the suck-back step, the suck-back plunger 36 is subject to pull operation in a direction opposite to that in the pre-supply step in a state where the first opening-closing valve 37, the second opening-closing valve 38, the third opening-closing valve 39, the fourth opening-closing valve 40, and the joining opening-closing valve 41 are closed and where the sealing body 26 and the suck-back opening-closing valve 42 are opened. Consequently, a predetermined amount of the liquid L is sucked out of (sucked back from) the container 50 formed in the predetermined shape in the molding step. Additionally, although in the present embodiment the first opening-closing valve 37, the second opening-closing valve 38, the third opening-closing valve 39, the fourth opening-closing valve 40, and the joining opening-closing valve 41 are closed in the suck-back step, closing at least the joining opening-closing valve 41 suffices.

The liquid L sucked out of the container 50 in the suck-back step is filled in the suck-back plunger 36 via the blow nozzle 22, the supply path 23, the suck-back port 25, and the suck-back pipe P3. As described earlier, in the pre-supply step of a preform 2 to be molded into a container next, the liquid L thus filled in the suck-back plunger 36 is to be filled in the preform 2.

After the suck-out of the predetermined amount of the liquid L is completed, the volume of the container 50 is reduced due to the sucked-out predetermined amount of the liquid L, and the container 50 is in a contracted and deformed state in which a gap is generated between the container 50 and the cavity 11, with the inside of the container 50 being placed in a negative pressure state lower than atmospheric pressure.

Figure 7:
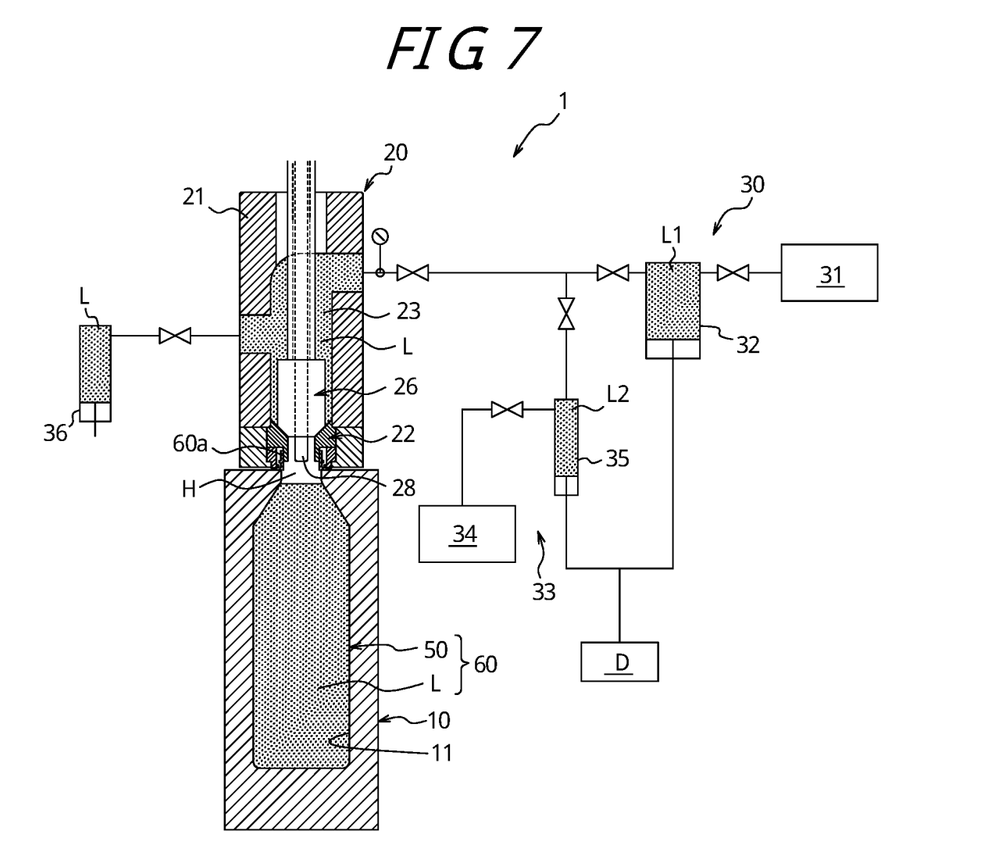
FIG. 7 illustrates the liquid blow molding apparatus in a state where liquid blow molding is completed.

After the suck-back step is completed, as illustrated in FIG. 7, the sealing body 26 is closed, and the stretching rod 28 is withdrawn from the liquid L, and thus, liquid blow molding is completed. Consequently, a liquid-containing container 60 in which a predetermined amount of the content liquid L is held in the container 50 is completed.

By exposing a mouth 60a of the liquid-containing container 60 to atmosphere after the sealing body 26 is closed, a liquid level of the content liquid L to be held in the liquid-containing container 60, that is, the volume of the content liquid L to be held in the liquid-containing container 60, may be regulated appropriately to create a predetermined head space H inside the liquid-containing container 60.

Although not illustrated in detail, after the liquid-containing container 60 is completed, a cap is attached to the mouth 60a of the liquid-containing container 60, and subsequently, the mold 10 is opened to remove the completed liquid-containing container 60 from the mold 10. The cap may also be attached after the liquid-containing container 60 is removed from the mold 10.

In this way, the presently disclosed liquid blow molding method performs liquid blow molding by simultaneously supplying the first liquid L1 and the second liquid L2 into the preform 2 through the separate pressurizing sources 32 and 35. Accordingly, even when the liquid L, such as a seasoning dressing in which the first liquid L1 mainly composed of oil and the second liquid L2 mainly composed of water and having properties to be easily separated from the first liquid L1 are mixed, in which the first liquid L1 and the second liquid L2 are difficult to be maintained in the mixed state is used as the content liquid L, the predetermined amount of the first liquid L1 and the predetermined amount of the second liquid L2 are supplied to the preform 2 through the separate systems at the predetermined ratio. The presently disclosed liquid blow molding method therefore allows easy production of the liquid-containing container 60 holding the content liquid L in which the first liquid L1 and the second liquid L2 are mixed at the predetermined ratio by liquid blow molding.

Furthermore, by performing the suck-back step after the molding step as in the present embodiment, the predetermined head space H is easily created inside the liquid-containing container 60 even in a case of a molding method not using a stretching rod.

Additionally, in a case of a molding method using a stretching rod, the suck-back step may be omitted, and the stretching rod may be withdrawn out of the liquid-containing container 60 after molding that is fully filled with the liquid L to create the head space corresponding to the volume of the withdrawn stretching rod inside the liquid-containing container 60.

Needless to say, the present disclosure is not limited to the above embodiment, and various changes may be made without departing the gist of the present disclosure.

For example, although the above embodiment describes the case where the presently disclosed liquid blow molding method is implemented by using the liquid blow molding apparatus 1 with the configuration of FIG. 1, the presently disclosed liquid blow molding method may be implemented by using a differently configured liquid blow molding apparatus or the like.

Moreover, although in the above embodiment the pre-supply step and the suck-back step, in addition to the filling step and the molding step, are performed, these steps may be omitted.

Moreover, although in the above embodiment the first liquid L1 and the second liquid L2 are joined (mixed) in the first pipe P1 at the time of liquid blow molding by configuring the second pipe P2 to be connected in the form of a branch to the point of the first pipe P1 that is located between the first liquid supply unit 30 and the supply port 24, the present disclosure is not limited to this embodiment. The second pipe P2 may be configured to be connected to the supply path 23 in the nozzle unit 20 at a port that is different from the first pipe P1, and the first liquid L1 and the second liquid L2 may be joined (mixed) in the supply path 23 at the time of liquid blow molding.

REFERENCE SIGNS LIST

1 Liquid blow molding apparatus
2 Preform
2a Mouth
2b Trunk
10 Mold
11 Cavity
20 Nozzle unit
21 Main body block
21a Support block
22 Blow nozzle
22a Sealing surface
23 Supply path
24 Supply port
25 Suck-back port
26 Sealing body
26a Abutment surface
27 Shaft body
28 Stretching rod
30 First liquid supply unit
31 First tank
32 First pressurizing source
33 Second liquid supply unit
34 Second tank
35 Second pressurizing source
36 Suck-back plunger
37 First opening-closing valve
38 Second opening-closing valve
39 Third opening-closing valve
40 Fourth opening-closing valve
41 Joining opening-closing valve
42 Suck-back opening-closing valve
43 Pressure gauge
50 Container
60 Liquid-containing container
L Liquid (content liquid)
L1 First liquid
L2 Second liquid
P1 First pipe
P2 Second pipe
P3 Suck-back pipe
D Driving source

The invention claimed is:

1. A liquid blow molding method for molding bottomed tubular-shaped preforms into liquid-containing containers configured to hold a content liquid, the liquid blow molding method comprising:
   a filling step of filling a first liquid in a first pressurizing source and filling a second liquid in a second pressurizing source, the first liquid and the second liquid being immiscible; and
   a molding step of liquid blow molding a first preform by simultaneously supplying, to the first preform, the first liquid pressurized to a first predetermined pressure by the first pressurizing source and the second liquid pressurized to a second predetermined pressure by the second pressurizing source by simultaneously operating the first pressurizing source and the second pressurizing source, the molding step resulting in a first container being formed from the first preform.

2. The liquid blow molding method of claim 1, further comprising a suck-back step performed after the molding step, the suck-back step including sucking a predetermined amount of the first liquid and the second liquid out of the first container after molding.

3. The liquid blow molding method of claim 2, further comprising a pre-supply step performed after the suck-back step and before a secondary molding step of a second preform to be molded after the molding step of the first preform, the pre-supply step including supplying, into the second preform at a third predetermined pressure, the first liquid and the second liquid that was sucked out of the first container in the suck-back step.

* * * * *